United States Patent [19]

Lüchinger

[11] 4,425,975
[45] Jan. 17, 1984

[54] WEIGHING APPARATUS INCLUDING CALIBRATING WEIGHT OPERATING MEANS

[75] Inventor: Paul Lüchinger, Uster, Switzerland

[73] Assignee: Mettler Instrumente AG, Greifensee, Switzerland

[21] Appl. No.: 348,344

[22] Filed: Feb. 12, 1982

[30] Foreign Application Priority Data

Apr. 10, 1981 [CH] Switzerland .................. 2418/81

[51] Int. Cl.³ .......................................... G01G 23/01
[52] U.S. Cl. ........................................ 177/50; 73/1 B; 177/212
[58] Field of Search ............... 177/50, 210 EM, 229, 177/212; 73/1 B

[56] References Cited

U.S. PATENT DOCUMENTS

| 2,832,535 | 4/1958 | Sherman | 177/31 |
| 3,788,411 | 1/1974 | Oxley | 177/229 X |
| 4,043,415 | 8/1977 | Luchinger | 177/229 X |
| 4,090,575 | 5/1978 | Kunz | 177/210 EM |
| 4,100,985 | 7/1978 | Meier | 177/210 EM X |
| 4,109,738 | 8/1978 | Kunz | 177/212 |
| 4,156,361 | 5/1979 | Melcher | 73/1 B |
| 4,170,269 | 10/1979 | Kunz | 177/212 X |
| 4,184,557 | 1/1980 | Kunz | 177/229 |
| 4,343,373 | 8/1982 | Stadler | 177/50 |

Primary Examiner—Joseph W. Hartary
Attorney, Agent, or Firm—Laubscher, Philpitt & Laubscher

[57] ABSTRACT

A weighing apparatus is disclosed of the type including a horizontal scale pan carrier connected at one end with a vertical load receiving member that is guided for vertical movement relative to the housing, characterized by the provision of a calibration weight removably mounted on the other end of the pan carrier beneath the scale pan, and a device for raising the calibration weight to an inoperable position relative to the pan carrier arm. In the preferred embodiment, the calibration weight comprises a horizontally arranged U-shaped member the center of gravity of which is arranged below the scale pan. In this manner, a compact and simple arrangement of the calibration weight is provided that furthermore facilitates ease of handling and operation.

6 Claims, 4 Drawing Figures

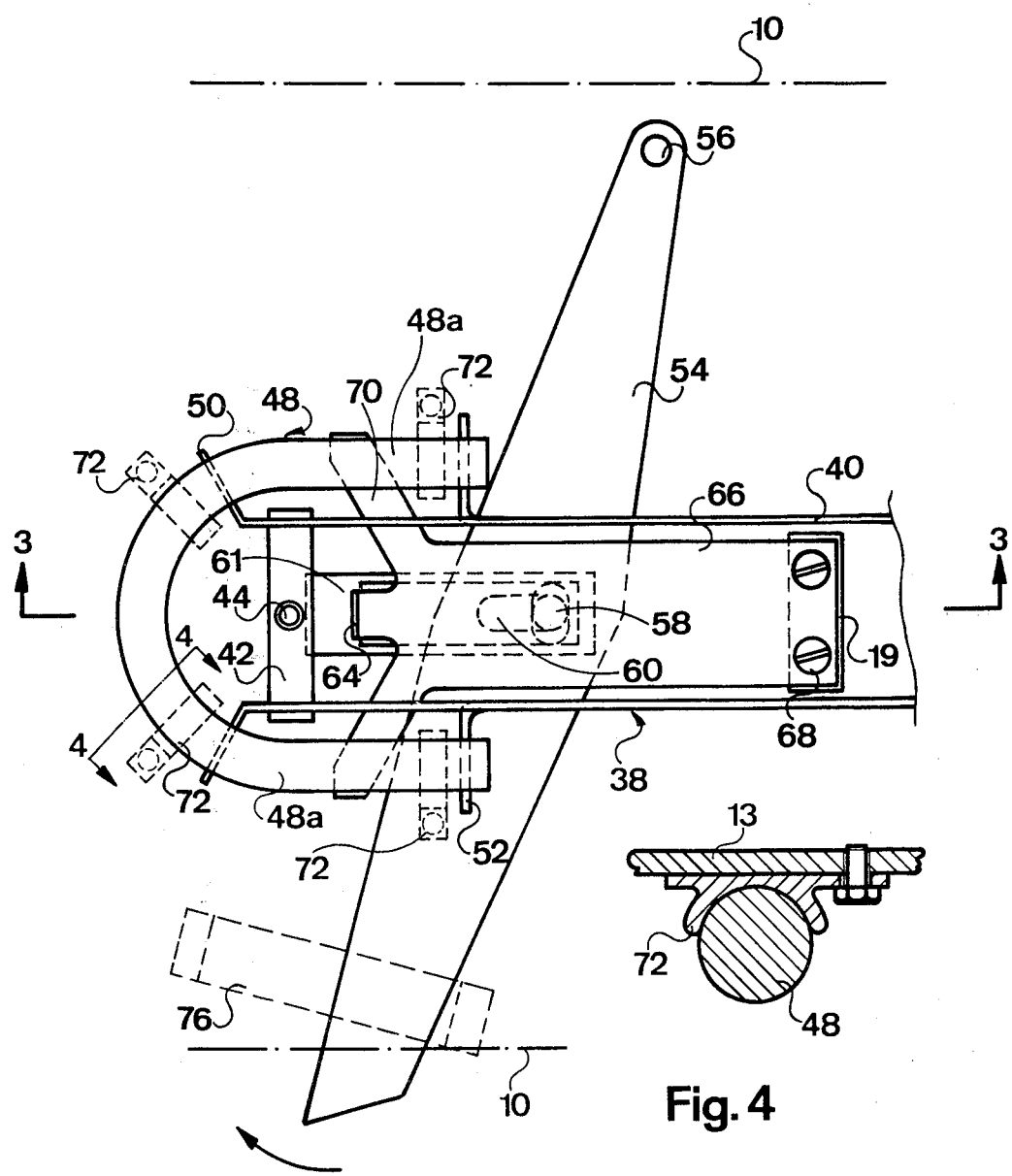

4,425,975

WEIGHING APPARATUS INCLUDING CALIBRATING WEIGHT OPERATING MEANS

BRIEF DESCRIPTION OF THE PRIOR ART

This invention relates to weighing apparatus of the type including a parallel-guided load receiving member having a laterally extending scale pan carrier arm; characterized by the provision of means for applying a calibrating weight to the scale pan carrier arm directly beneath the scale pan.

Weighing systems of the return-to-zero electromagnetic load compensation type are well known in the patented prior art, as evidenced, for example, by the prior patents to Kunz U.S. Pat. Nos. 4,109,738, 4,170,269 and 4,184,557, Lüchinger U.S. Pat. No. 4,043,415 and Kunz et al U.S. Pat. No. 4,090,575, among others. In the companion Lüchinger U.S. application Ser. No. 346,759 filed Feb. 8, 1982, a weighing apparatus is disclosed including a load receiving member that is guided for vertical movement by parallel guidance means, the horizontal scale pan carrier arm extending laterally from, and being resiliently connected with, the load receiving member, thereby to protect the apparatus against damage in the event that the scale pan is subjected to impact.

To check on the sensitivity of a scale it is customary from time to time to place an accurate calibration weight on the scale pan, to weigh it, and to determine the correction factors from the weighing result. It is also known to provide a scale with a scale pan arranged above the parallel guidance means, which scale contains a built-in calibration weight which, when necessary, can be connected with the weighing mechanism in the manner of a switchable weight, as shown, for example, by the German Pat. No. 2,601,165.

It was the purpose of this invention to transfer the known principle to a scale of the kind mentioned above, if possible by saving space, whereby furthermore the idea was to try to come up with simple mechanics and easy handling and operation.

SUMMARY OF THE INVENTION

In accordance with a primary object of the present invention, means are provided for alternately raising and lowering a calibrating weight on a laterally extending carrier arm at a location directly beneath the scale pan. In accordance with a preferred embodiment of the invention, the calibration weight is in the form of a horizontally-arranged U-shaped member the leg portions of which extend generally horizontally and whose center of gravity is at least approximately on the vertical axis of the scale pan. In this way an extremely space-saving arrangement is provided. Moreover, this provides the considerable advantage that by virtue of the location of the center of gravity of the calibration weight below the center of gravity of the scale pan, corner load errors are avoided which might arise because the arrangement of the scale pan is shifted with respect to the parallel guidance—if the calibration weight were to be arranged somewhere else.

One practical embodiment of the invention is characterized by the fact that, to put down or take off the calibration weight, there is provided a lever which can be operated from outside the scale housing, whereby the lever protrudes from the housing border when in the calibration position and, when in the resting position, again disappears into the housing. In this way, the operator is reminded to disconnect the calibration weight again from the weighing mechanism after calibration has been completed.

BRIEF DESCRIPTION OF THE DRAWING

Other objects and advantages of the invention will become apparent from a study of the following specification when viewed in the light of the accompanying drawing, in which:

FIG. 2 is a detailed top plan view of the calibrating weight operating means of the present invention; and FIGS. 3 and 4 are sectional views taken along lines 3—3 and 4—4, respectively, of FIG. 2.

DETAILED DESCRIPTION

Figure 1:
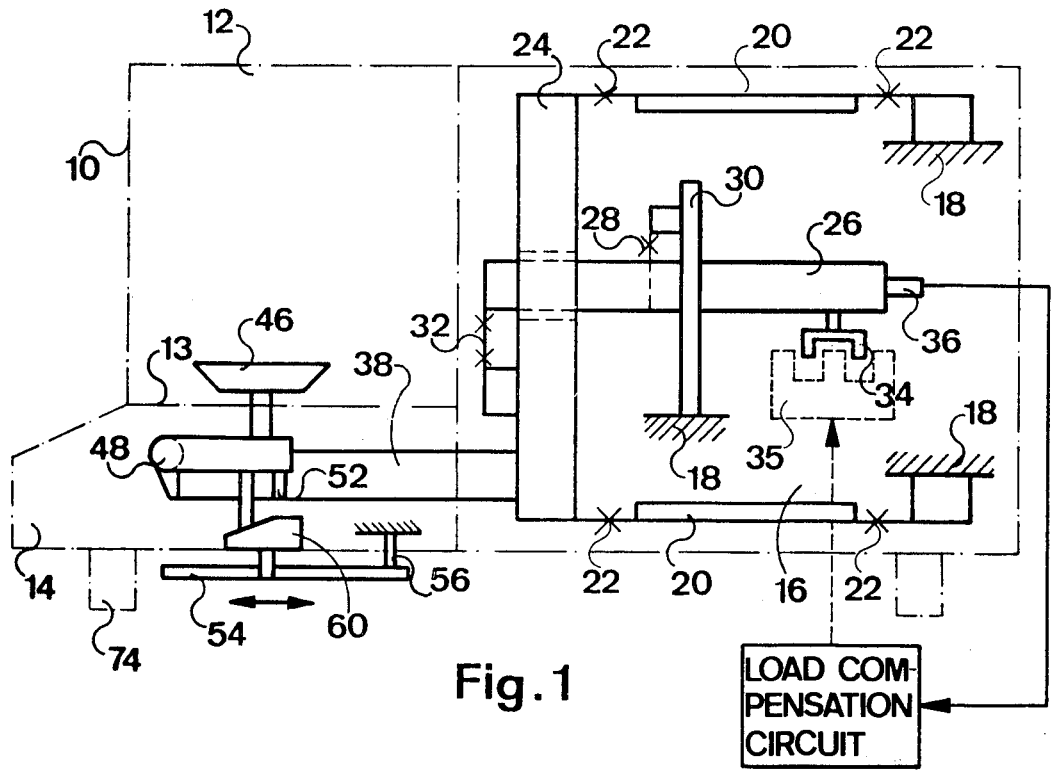
FIG. 1 is a generally diagrammatic view of a weighing system including the calibration means of the present invention.
Figure 3:
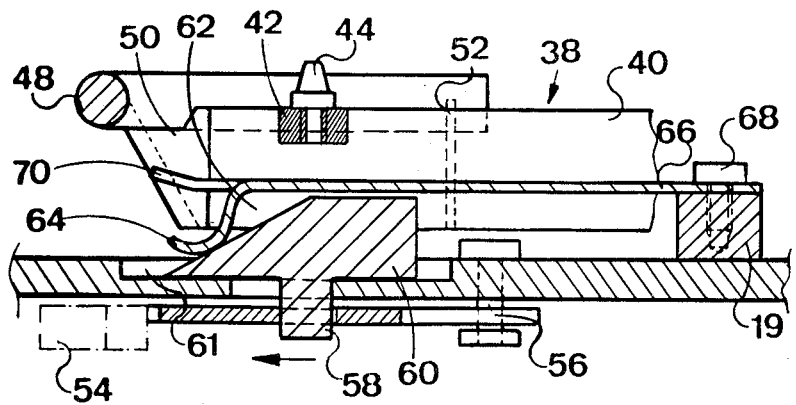

Referring first more particularly to FIG. 1, the weighing apparatus includes a housing 10 containing a weighing chamber 12, a lower forward chamber 14 that contains the calibration means of the present invention, and a rear chamber 16 that contains the guidance means for the movable load receiving means, as well as the weighing electronics circuits.

A vertical load receiving member 24 is connected for guided vertical movement relative to the housing 10 by upper and lower horizontally arranged parallel guidance plates 20 (which generally have a triangular configuration), which guidance plates are connected at opposite ends by flexure bearings 22 with housing bearing block portions 18 and with the load receiving member 24, respectively. A horizontally arranged scale lever 26 is supported intermediate its ends by flexure bearing 28 from fixed support 30. At one end, the lever 26 carries the coil 34 of an electromagnetic load compensation system 35, the pivotal displacement of the lever 26 about flexure bearing pivot axis 28 being measured by stationary optical scanning means 36, as is known in the art. At its other end, the lever 26 extends through an opening contained in the load receiving member 24, the load receiving member being suspended from the lever 26 by flexure bearing 32.

Connected at one end with the lower end of lever 24 is a horizontally extending scale pan carrier arm 38, which comprises a pair of parallel light sheet metal side panels 40 that are connected at one end by the transverse strut 42 upon which is threadably mounted a scale pin 44 that extends upwardly through an opening contained in the bottom wall 13 of the weighing chamber 12, the upper portion of the pin having a frustoconical configuration for connection with a weighing pan 46 arranged in the weighing chamber.

Arranged beneath the scale pan 46 and the weighing chamber bottom wall 13 is a horizontally arranged U-shaped calibration weight 48 having a circular cross-sectional configuration. When in the illustrated lower calibrating position, the calibration weight is mounted on the laterally extending end wing portions 50 and on the outwardly bent tab cutout portions 52 of the carrier arm side plates 40. For example, in the case of an analytical scale having a weighing range of 160 g., the mass of the calibrating weight is on the order of 100 g. As shown in FIG. 2, the leg portions 48a of the U-shaped calibration weight extend parallel with, and adjacent the outer surfaces of, the carrier arm side plates 40, the center of gravity of the calibrating weight coinciding with that of the scale pan carrier pin 44.

Pivotally connected at one end with the base of the housing by means of the pivot pin 56 is a calibrating weight operating lever 54. In the illustrated weight-lowered position, the free end of the lever 54 extends slightly laterally outwardly of the housing. This lever may be pivoted in the clockwise direction (as shown by the arrow in FIG. 2) toward a calibrating weight elevating position in which the lever is concealed beneath the housing, the extend of pivotal movement of the lever being limited by the sheet metal stop loop 76 secured to the bottom of the housing base. Intermediate its ends the lever 54 contains an opening that receives an integral pin portion 58 that depends downwardly from a wedge block 60 that is slidably mounted in a rectangular recess 61 contained in the upper surface of the housing base. In sliding engagement with the inclined surface 62 of the wedge block 60 is a centrally arranged downwardly bent finger portion 64 arranged at one end of a resilient follower member that is bolted at its other end by bolt 68 to the housing bearing block portion 19. The follower member includes outwardly extending arm portions 70 that extend beneath the leg portions 48a of the U-shaped calibration weight 48 as shown in FIG. 2. It is apparent that when the lever 54 is pivoted in the clockwise direction in FIG. 2 from the illustrated extended position toward the retracted position beneath the base of the housing 10, wedge block 60 is shifted to the left, whereby owing to the cooperation between finger 64 and the wedge surface 62, the left hand end of the follower member 66 is elevated to lift the U-shaped calibrating weight from the carrier arm 38 upwardly toward an inoperative position in engagement with four retainer means 72 that are bolted to the lower surface of the weighing chamber bottom wall 13. The weighing apparatus is thus in its unloaded condition for normal weighing operation.

In addition to the sheet metal loop stop means 76, the lever 54 is further limited by the extent of travel of wedge block 60 within the recess 61.

While the preferred form and embodiment of the invention has been illustrated and described, it will be apparent that various modifications may be made without deviating from the inventive concepts set forth above.

What is claimed is:

1. In a weighing apparatus including a stationary housing (10); load receiving means including a vertical load receiving member (24), a scale pan (46), and horizontal carrier arm means (38) connecting said scale pan in laterally spaced relation to said load receiving member; and parallel guidance means (20, 22) connecting said load receiving member for vertical movement relative to said housing; the improvement which comprises calibrating means for calibrating the operation of said weighing apparatus, said calibrating means including a calibration weight (48) removably mounted on said carrier arm means adjacent and generally below said scale pan, said calibration weight being generally U-shaped and arranged in a horizontal plane, the leg portions (48a) of said calibration weight extending generally parallel with and on opposite sides of the longitudinal axis of said carrier arm, the center of gravity of said calibration weight being generally coincident with the vertical axis of said scale pan.

2. Apparatus as defined in claim 1, and further including weight displacing means having a lever (54) pivotally connected with said housing for raising said calibration weight from, and for lowering said calibration weight upon, said carrier arm means, respectively.

3. Apparatus as defined in claim 2, wherein said calibrating weight displacing means further includes a wedge block (60) connected with said housing for linear sliding displacement by said lever, and a generally Y-shaped horizontally arranged resilient follower member (66) operable by said wedge block, said follower member including a pair of arm portions (70) tat extend beneath the leg portions of said calibrating weight, and a centrally arranged tongue portion (64) arranged for engagement by said wedge block.

4. Apparatus as defined in claim 2, and further including stop means (76) for preventing pivotal movement of said operating lever beyond said weight raising and weight lowering positions, respectively.

5. Apparatus as defined in claim 2, wherein said operating lever is arranged in retracted and extended positions relative to said housing when said calibrating weight is in the raised and lowered conditions relative to said carrier arm means, respectively.

6. Apparatus as defined in claim 1, and further including means (72) connected with the housing for at least partially positioning said calibrating weight when said weight is lifted from said carrier arm.

* * * * *